(12) United States Patent
Rajamani (10) Patent No.: US 8,770,940 B2
(45) Date of Patent: Jul. 8, 2014

(54) BLADE SECTION FOR A WIND TURBINE BLADE

(75) Inventor: Rajkumar Rajamani, Tamilnadu (IN)

(73) Assignee: LM Glasfiber A/S, Kolding (DK)

( * ) Notice: Subject to any disclaimer, the term of this patent is extended or adjusted under 35 U.S.C. 154(b) by 801 days.

(21) Appl. No.: 13/059,866

(22) PCT Filed: Aug. 21, 2009

(86) PCT No.: PCT/EP2009/060835
§ 371 (c)(1),
(2), (4) Date: Feb. 25, 2011

(87) PCT Pub. No.: WO2010/020692
PCT Pub. Date: Feb. 25, 2010

(65) Prior Publication Data
US 2011/0164984 A1 Jul. 7, 2011

(30) Foreign Application Priority Data
Aug. 21, 2008 (EP) .................................. 08014876

(51) Int. Cl.
*F03D 11/00* (2006.01)
(52) U.S. Cl.
USPC .................................................. 416/223 A
(58) Field of Classification Search
USPC .............. 416/204 R, 207, 210 R, 213 R, 239, 416/223 A
See application file for complete search history.

(56) References Cited

U.S. PATENT DOCUMENTS

| | | | |
|---|---|---|---|
| 5,401,138 A | 3/1995 | Mosiewicz | |
| 2003/0138290 A1 | 7/2003 | Wobben | |
| 2008/0145231 A1* | 6/2008 | Gonzales et al. | 416/243 |

FOREIGN PATENT DOCUMENTS

| | | |
|---|---|---|
| DE | 42 25 599 A1 | 2/1994 |
| EP | 1 584 817 A1 | 10/2005 |
| WO | 01/48378 A1 | 7/2001 |
| WO | 2006/103307 A2 | 10/2006 |

* cited by examiner

*Primary Examiner* — Edward Look
*Assistant Examiner* — Maxime Adjagbe
(74) *Attorney, Agent, or Firm* — Nath, Goldberg & Meyer; Jerald L. Meyer (57) ABSTRACT

A blade section for a wind turbine blade, the blade section extending along a longitudinal axis and having at least a first end, the blade section comprising a main blade section with a contour having an outer surface. The main blade section at the first end is provided with a number of connection elements, each connection element being pivotally engaged with the main blade section about a rotational axis. Each of the connection elements being provided with a joining means for anchoring each of the connection element to another blade section. The joining means of each of the number of connection elements is arranged in a distance from the rotational axis.

15 Claims, 5 Drawing Sheets

BLADE SECTION FOR A WIND TURBINE BLADE

TECHNICAL FIELD

The present invention relates to a blade section for a wind turbine blade, the blade section extending along a longitudinal axis and having at least a first end, the blade section comprising a main blade section with a contour having an outer surface. The invention also relates to a wind turbine blade comprising at least a first blade section and a second blade section. The invention furthermore relates to a method for assembling a wind turbine blade.

BACKGROUND

Wind turbine blades of fibre-reinforced polymer are usually manufactured as shell parts in moulds, where the top side and the bottom side of the blade profile (typically the pressure side and suction side, respectively) are manufactured separately by arranging glass fibre mats in each of the two mould parts. Afterwards, the two halves are glued together, often by means of internal flange parts. Glue is applied to the inner face of the lower blade half before the upper blade half is lowered thereon. Additionally, one or two reinforcing profiles (beams) are often attached to the inside of the lower blade half prior to gluing to the upper blade half.

The shell parts for the wind turbine blade are typically manufactured as fibre composite structures by means of VARTM (vacuum assisted resin transfer moulding), where liquid polymer, also called resin, is filled into a mould cavity, in which fibre material priorly has been inserted, and where a vacuum is generated in the mould cavity, hereby drawing in the polymer. The polymer can be thermoset plastic or thermoplastics.

Vacuum infusion or VARTM is a process used for moulding fibre composite mouldings, where uniformly distributed fibres are layered in one of the mould parts, the fibres being rovings, i.e. bundles of fibre bands, bands of rovings, or mats, which are either felt mats made of individual fibres or woven mats made of fibre rovings. The second mould part is often made of a resilient vacuum bag, and is subsequently placed on top of the fibre material. By generating a vacuum, typically 80% to 95% of the total vacuum, in the mould cavity between the inner side of the mould part and the vacuum bag, the liquid polymer can be drawn in and fill the mould cavity with the fibre material contained herein. So-called distribution layers or distribution tubes, also called inlet channels, are used between the vacuum bag and the fibre material in order to obtain as sound and efficient a distribution of polymer as possible. In most cases, the polymer applied is polyester or epoxy, and the fibre reinforcement is most often based on glass fibres or carbon fibres.

It is commonly known that moulds for making large articles, such as wind turbine blades, and consisting of two mould parts are closed about a longitudinal hinge line, where the hinges are passive, i.e. a crane is used to lift one of the mould parts about the hinge line for closure and opening of the mould. When making wind turbine blades, the mould is closed so as to glue two blade shell halves together, said shell halves being produced in separate mould parts.

Wind turbine blades have become increasingly longer over the years and blades of more than 60 metres are mass-produced, which means that mould assemblies for moulding such blades also have become increasingly larger. This results in problems in regard to the mould assemblies used, since the mould part rotating with respect to the other one during closure of the mould assembly reaches a very great height during the rotary motion, which may entail that the height of the ceiling in the halls where the blades are manufactured must be very great. This means that the halls become more expensive to build, or that the ceilings in existing halls have to be raised, which of course also results in higher financial costs. Furthermore, transport of these large composite structures is problematic.

Therefore, it has been proposed to separate wind turbine blades into two or more separate blade sections and then assemble the blades at the erection site of a wind turbine. Thereby, it is possible to manufacture the separate blade sections in smaller moulds and it is less problematic to transport the much smaller blade sections. An example of such a blade is described in WO 06/103307.

As another example, US2003/0138290A1 discloses a butt connection for joining a first hollow profile member and a second hollow profile member, whereby a wind turbine blade can be formed. The first hollow profile member and the second hollow profile member are joined by means of a multiplicity of straps bridging over the joint between them, and by each of the straps having one end fixed to the first hollow profile member and the other end fixed to the second hollow profile member.

As yet another example, EP1584817A1 discloses a wind turbine blade transversely subdivided into two or more independent modules, where each modules comprises an internal longitudinal reinforcement structure, that at the end of the internal longitudinal reinforcement structure comprises lugs, such that the modules that be connected to each other. Subsequently, a cuff is arranged on top of the lugs so as to provide an aerodynamic surface.

However, the dividable wind turbine blade disclosed in US2003/0138290A1 is not aerodynamically efficient and will generate noise as a number of straps are arranged externally to the wind turbine blades aerodynamically profile, and thus the straps will interfere and disturb the flow around the dividable wind turbine blade. The dividable wind turbine blade disclosed in EP1584817A1 and WO06/103307 resolves these problems. However the problems are resolved by introducing an internal reinforcement structure along the longitudinal direction of the dividable wind turbine blade, and thus the problems remains unsolved for a wind turbine blade without a thoroughgoing internal reinforcement structure. Furthermore, the dividable blade is encumbered with the disadvantage that the joint is arranged internally of the blade shell, which means that one either has to climb into the blade shell in order to assemble the blade or that the blade has to be covered with an additional surface cover after assembly. Also, the joint is provided only in a central part of the cross section. Thus, the joint may cause an unbalance or internal stress boundaries in the cross section or transverse direction of the blade.

DISCLOSURE OF THE INVENTION

It is an object of the invention to obtain a new blade section for a wind turbine blade, as well as a new wind turbine blade and a new method for assembling a wind turbine blade which overcomes or ameliorates at least one of the disadvantages of the prior art or which provides a useful alternative. An advantage of the invention is that the dividable wind turbine blade after being assembled from a number of blade sections can be divided back into the number of blade sections, thus the assembly process is reversible. This feature is advantageous since the dividable wind turbine blade thus can be divided when needed e.g. due to inspection, maintenance and/or repair.

According to a first aspect of the invention, this is obtained by that the main blade section at the first end is provided with a number of connection elements, each of the number of connection elements being pivotally engaged with the main blade section about a rotational axis, and each of the number of connection elements being provided with a joining means for anchoring each of the number of connection elements to another blade section and wherein the joining means of each of the number of connection elements is arranged in a distance from the rotational axis. Hereby, a blade section is provided, where each of the number of connection elements, in a joining position, can be joined to another blade section via the joining means and each of the connection elements can be pivoted to an anchor position about the rotational axis while being joined to the other blade section.

Since the connection elements are pivotally engaged with the main blade section in such a way that the joining means are arranged in a distance (or equivalently a spacing) from the rotational axis, the connection elements may be rotated about the rotational axis in such a way that the joining means is brought to a position, where the joining means are positioned externally to the surface of the main blade section. Thus, the joining means are easily accessible and may readily be anchored to the joining means of a corresponding second blade part.

In another embodiment according to the invention each of the number of connection elements comprises a first outer surface part, which in a first pivotal position flushes with at least a part of the outer surface of the main blade section. Thereby, the number of connection elements after being anchored to corresponding number of connection elements of another blade section may be brought to a position, where they form a smooth aerodynamic surface together with the main blade section.

In another embodiment according to the invention the first outer surface part of each of the number of connection elements in the first pivotal position abuts at least a part of the outer surface of the main blade section. Hereby, a blade section is provided where the transition from the main blade section to the connection elements is smooth and continuous, thus maintaining the blade section aerodynamically efficient and with a low noise level.

In another embodiment according to the invention the main blade section comprises a number of juxtaposed connection elements. Thereby, it is possible to anchor the connection elements to a corresponding number of connection elements on another blade section, thereby providing a strong mechanical joint throughout the entire cross section.

In another embodiment according to the invention the first outer surface part of each of the number of connection elements in the first pivotal position flushes with the first outer surface part of at least one juxtaposed connection element. Thereby, the connection elements forms a smooth, continuous and nearly seamless aerodynamic outer surface in the entire cross section of the blade section or at least a part of the cross section.

In another embodiment according to the invention the first outer surface part of each of the number of connection elements in the first pivotal position abuts the first outer surface part of at least one juxtaposed connection element. Hereby, a blade section is provided where the transition in between the number of connection elements is smooth and continuous, thus maintaining the blade section aerodynamically efficient and with a low noise level. Furthermore, the individual connection elements support each other, thus providing an even stronger mechanical joint.

In another embodiment according to the invention at least one of the number of connection elements is pivotally engaged with the main blade section by means of a shaft extending from the first end of the main blade section via a bore in the connection element. Hereby, a blade section is provided where the number of connection elements by means of standard components such as a treaded shaft and/or bolt and nut means can be pivotally engaged with the main blade section. Each of the connection elements can be equipped with a recess such that the entire nut in a mounted position is below the surface without the recess.

In another embodiment according to the invention at least one connection element is engaged with a bore in the first end of the main blade section by means of a shaft extending from the connection element. Hereby, a blade section is provided where the number of connection elements by means of standard components such as a treaded shaft and/or bolt and nut means can be pivotally engaged with the main blade section.

In another embodiment according to the invention the rotational axis of at least one connection element is substantially parallel to the longitudinal axis. Hereby, a blade section is provided where the first end has a surface substantially perpendicular to the longitudinal direction. The number of connection elements comprises in the blade section is at least 5, 10, 15, 20, 25, 30, 40, 50 or even 60.

According to one embodiment, the blade section has a longitudinal length in the interval between 10 and 60 meters, or 12 and 50 meters, or 15 and 40 meters.

The blade section may further be provided with a second end having additional connection elements according to the invention. Thus, the blade section may be a middle part of an assembled blade, so that the blade section is assembled with two additional blade parts. The wind turbine blade may of course be assembled by any number of blade sections, such as two, three, four or five.

According to a second aspect of the invention, the object is obtained by a wind turbine blade comprising at least a first blade section and a second blade section according to any of the preceding claims, wherein the rotational axis of each of the number of connection elements of the first blade section and the rotational axis of each of the number of connection elements of the second blade section are pairwise aligned. Hereby, a wind turbine blade is provided, where each of the number of connection elements of the first blade section and each of the number of connection elements of the second blade section with an pairwise aligned rotational axis can pivot about the same rotational axis.

In another embodiment according to the invention the joining means of each of the number of connection elements of the first blade section and the joining means of each of the number of connection elements of the second blade section are pairwise rigidly anchored to form a number of pairwise rigidly anchored connection elements. Hereby, a wind turbine blade is provided where each of the number of connection elements of the first blade section and each of the number of connection elements of the second blade section which are pairwise rigidly anchored and has a pairwise aligned rotational axis can pivot about the same rotational axis. The joining means comprises welding, adhesive means, nut(s) and bolt(s) or the like.

In another embodiment according to the invention each of the number of the pairwise rigidly anchored connection elements in the first pivotal position are fixed by a fastening means to at least one juxtaposed pairwise rigidly anchored connection element. Hereby, a wind turbine blade is provided where each of the number of the pairwise rigidly anchored connection elements in the first pivotal position is fixed by the fastening means, and thus can not pivot about the rotational axis during use. Thus, the connection elements will not inadvertently during use of the wind turbine blade rotate to a position, where the connection elements impair the aerodynamic effectiveness of the blade.

According to a second aspect of the invention, the object is obtained by a method for assembling a wind turbine blade wherein the method comprises the following steps: a) aligning the first blade section and the second blade section in the longitudinal direction, so at least one of the first connection elements and at least one of the second connection elements has a common rotational axis, b) pairwise rigidly anchoring the number of first connection elements of the first blade section to the number of second connection elements of the second blade section via the joining means, d) pivoting each of the number of the pairwise rigidly anchored connection elements to the first pivotal position. Hereby, a method is provided where the wind turbine blade can be assembled from a number of blade sections at the erection site, thus making the transportation easier since the blade sections are shorter than an assembled wind turbine blade.

In another embodiment according to the invention the joining means comprises nut and bolt means, adhesion, gluing or welding. Hereby, standard components, techniques and tools can be used to assemble the wind turbine blade from a number of blade sections at the erection site. Thus use of expensive, specialized and/or heavy tools can be avoided making the assembling process more cost-efficient and more versatile.

In another embodiment according to the invention the method further comprises a step preceding step d), wherein the pairwise rigidly anchored connection elements are fixed by a fastening means to at least one juxtaposed pairwise rigidly anchored connection elements. Hereby, a method is provided where the pairwise rigidly anchored connection elements are prevented from pivoting when fastened to the juxtaposed pairwise rigidly anchored connection element.

BRIEF DESCRIPTION OF THE DRAWING(S)

The invention is explained in detail below with reference to an embodiment shown in the drawings, in which.

DETAILED DESCRIPTION OF THE INVENTION

Figure 1:
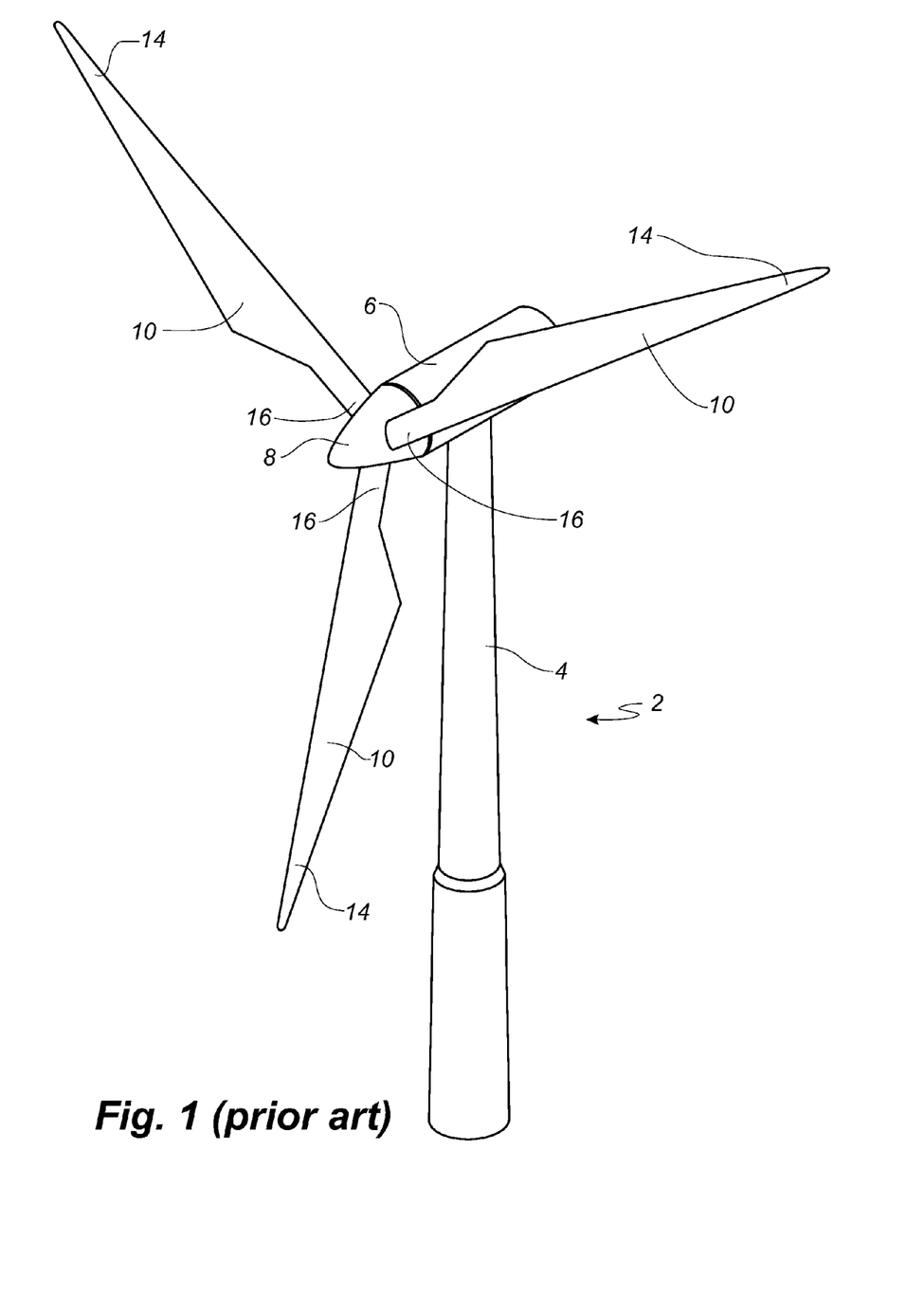
FIG. 1 shows a prior art wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub 8 and a blade tip 14 furthest from the hub 8.

Figure 2:
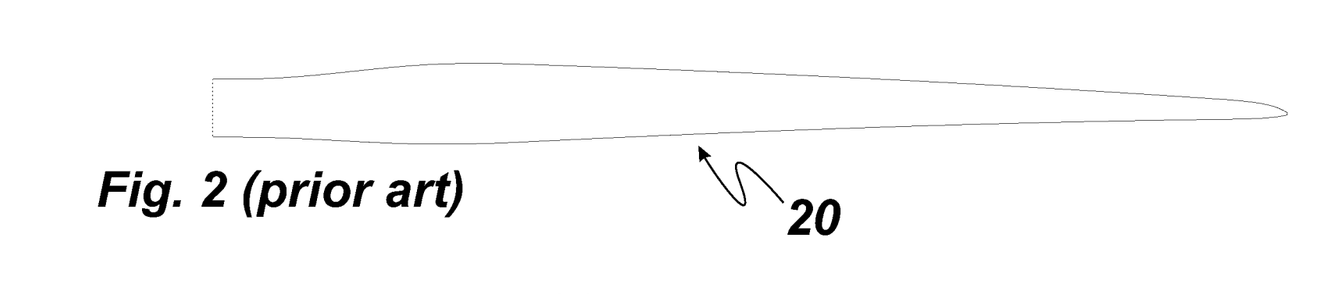
FIG. 2 shows a prior art wind turbine blade.

FIG. 2 illustrates a conventional non-dividable wind turbine blade 20, which conventionally is manufactured either in one piece or in two pieces, where the two pieces each has the same length in the longitudinal direction as a wind turbine blade assembled by the two pieces.

Figure 3:
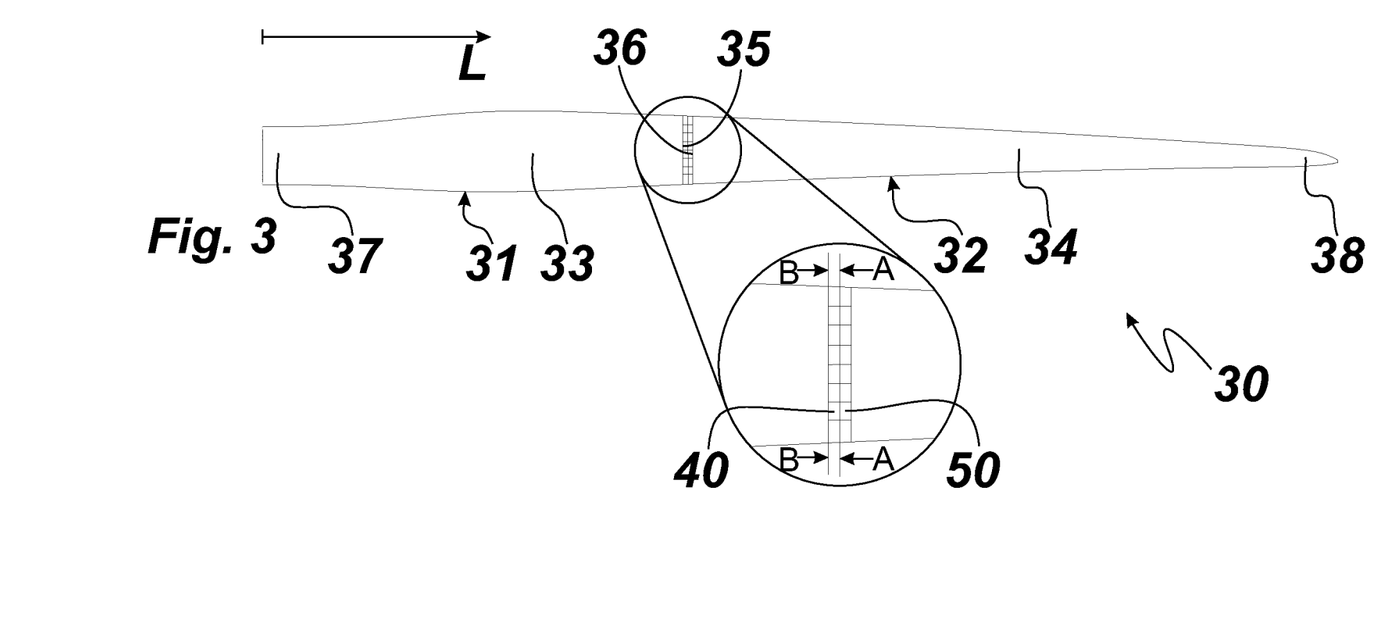
FIG. 3 shows a dividable wind turbine blade according to the invention.

FIG. 3 illustrates a dividable wind turbine blade 30 in an assembled configuration. The dividable wind turbine blade 30 is extending between a root region 37 and a tip region 38 in a longitudinal direction L, and comprises a first blade section 31 and a second blade section 32. The first blade section 31 comprises the root region 37, a first end 35 facing away from the root region 37 of the blade 30 and a first main blade section 33 in between the root region 37 and the first end 35, where the first main blade section has a lift generating profile generating a lift when being impacted by an incident airstream. The first end 35 of the first main blade section 33 is pivotally engaged with a number of first connection elements 40. The second blade section 32 comprises the tip region 38, a first end 36 facing away from the tip region 38 of the blade 30 and a second main blade section 34 in between the tip region 38 and the first end 36, where the second main blade section has a lift generating profile. The first end 36 of the second main blade section 34 is pivotally engaged with a number of second connection elements 50.

The first blade section 31 and the second blade section 32 are connected to each other at a joint by anchoring the number of first connection elements 40 to the corresponding number of second connection elements 50. The first connection elements 40 have a first outer surface and the second connection elements 50 have a second outer surface. The first connection elements 40 and second connection elements 50 are shown in a first pivotal position, where the first connection elements' 40 first outer surfaces and the second connection elements' second outer surfaces flush with and abut to the first main blade section 33 and second main blade section 34, respectively. Furthermore, the first outer surfaces flush with the second outer surfaces, so that the connection between the two blade sections 31, 32 provides a smooth aerodynamic surface, which nearly seamlessly abuts the outer surfaces of the main blade sections 33, 34.

Figure 4:
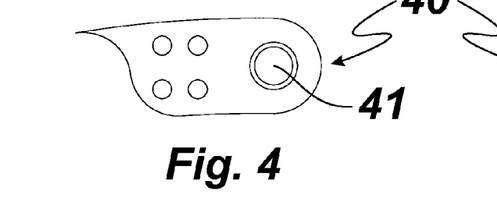
FIG. 4 shows a side view of a connection element according to the invention.

FIG. 4 illustrates an example of a first connection element 40 in a side view. The first connection element 40 has a bore 41 through the first connection element 40. The bore 41 has a countersink for receiving a head of a screw or for housing a nut, such that the head of the screw or the nut does not extend beyond the shown side surface of the first connection element 40. The bore 41 is used for pivotally engaging the first connection element 40 with the first end 35 of the first blade section 31 and the center of the bore 41 defines a rotational axis 55, about which rotational axis 55 the first connection element 40 can pivot. The side surface of the shown first connection element 40 will, in the first pivotal position, face away from the first end 35 of the first blade section 31 to which the first connection element 40 is pivotally engaged with.

Figure 5:
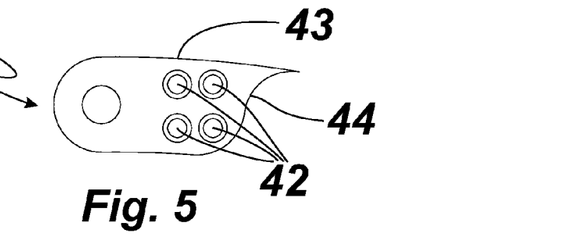
FIG. 5 shows a side view of a connection element according to the invention.

FIG. 5 illustrates the first connection element 40 in a side view opposite to the side view shown in FIG. 4. The first connection element 40 has a first outer surface 43, which is designed to flush and abut a part of a surface of the first main blade section 33 and a second surface part 44 which is designed to abut an outer surface of another juxtaposed first connection element 40'. The first connection element 40 has a joining means for rigidly anchoring the first connection element 40 to a second connection element 50. The joining means is shown as a number of bores 42 through the first connection element 40 and the bores each has a countersink for receiving a head of a screw or for housing a nut, such that the head of the screw or the nut does not extend beyond the shown side surface of the first connection element 40. The joining means are placed in a distance from the bore 41, such that the first connection element 41, when rigidly anchored to the second connection element 50, can pivot about the rotational axis 55. The side surface of the shown first connection element 40 will, in the first pivotal position, face the first end 35 of the first blade section 31 to which the first connection element 40 is pivotally engaged with.

Figure 6:
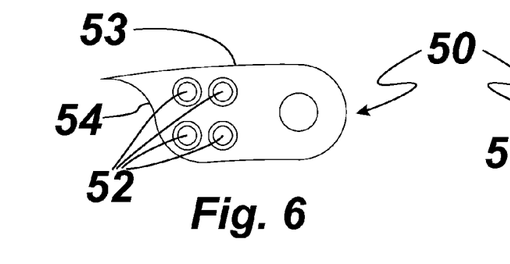
FIG. 6 shows a side view of a connection element according to the invention.

FIG. 6 illustrates the second connection element 50 in a side view. The second connection element 50 has a first outer surface 53, which is designed to flush and abut a part of a surface of the second main blade section 34 and a second surface part 54, which is designed to abut an outer surface of another juxtaposed second connection element. The second connection element 50 has a joining means for rigidly anchoring the second connection element 50 to the first connection element 40. The joining means is shown as a number of bores 52 through the second connection element 50 and the bores 52 each has a countersink for receiving a head of a screw or for housing a nut, such that the head of the screw or the nut does not extend beyond the shown side surface of the second connection element 50. The joining means are placed in a distance from the bore 51, such that the second connection element 51, when rigidly anchored to the first connection element 40, can pivot about the rotational axis 55. The side surface of the shown second connection element 50 will, in the first pivotal position, face the first end 36 of the second blade section 32 to which the second connection element 50 is pivotally engaged with.

Figure 7:
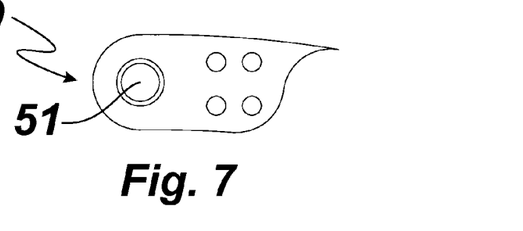
FIG. 7 shows a side view of a connection element according to the invention.

FIG. 7 illustrates a second connection element 50 in a side view opposite to the side view shown in FIG. 6. The second connection element 50 has a bore 51 through the second connection element 50. The bore 51 has a countersink for receiving a head of a screw or for housing a nut, such that the head of the screw or the nut does not extend beyond the shown side surface of the second connection element 50. The bore 51 is used for pivotally engaging the second connection element 50 with the first end 36 of the second blade section 32, and the center of the bore 51 defines a rotational axis 55, about which rotational axis 55 the second connection element 50 can pivot. The side surface of the shown second connection element 50 will, in the first pivotal position, face away from the first end 36 of the second blade section 32 to which the second connection element 50 is pivotally engaged with.

Figure 8:
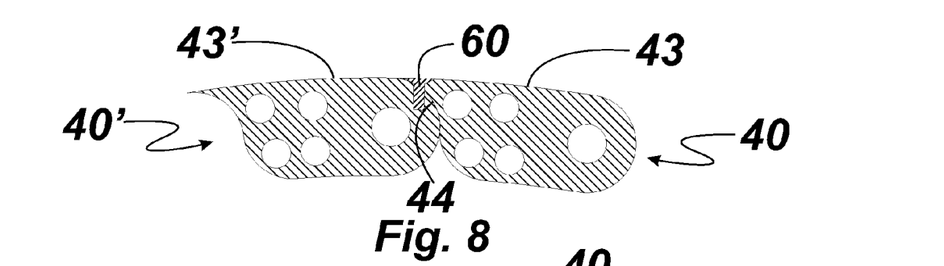
FIG. 8 shows a cross section of two juxtaposed connection elements according to the invention.

FIG. 8 illustrates a cross sectional view of a first connection element 40 and another juxtaposed first connection element 40' in the first pivotal position, where the second surface part 44 abuts and flushes with the surface of the juxtaposed first connection element 40'. The first connection element 40 and the juxtaposed connection element 40' are fastened to each other by means of a screw 60. Accordingly, the juxtaposed connection element 40' may be provided with a number of threaded bores in the outer surface.

Figure 9:
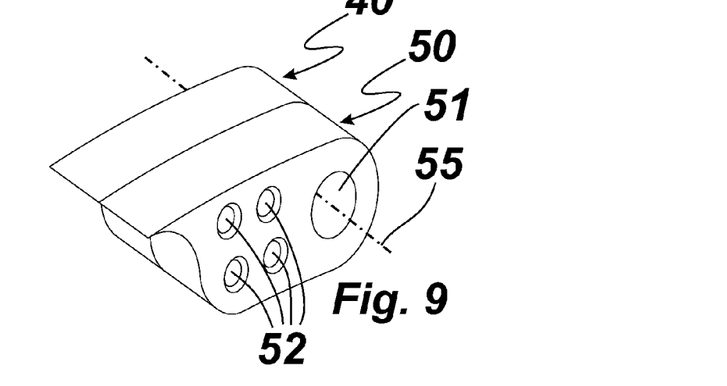
FIG. 9 shows a perspective view of two connection elements according to the invention.

FIG. 9 illustrates a perspective view of the first connection element 40 and the second connection element 50 before being rigidly anchored to each other via a joining means such as nut and bolt through the bores 52 and the bores 51. The common rotational axis 55 for the first connection element 40 and the second connection element 50 is extending through the bore 51 of the second connection element and through the bore 41 of the first connection element 40, and when the first connection element 40 and the second connection element 50 are rigidly anchored to each other, the rigidly anchored joined connection element can pivot about the rotational axis 55.

Figure 10:
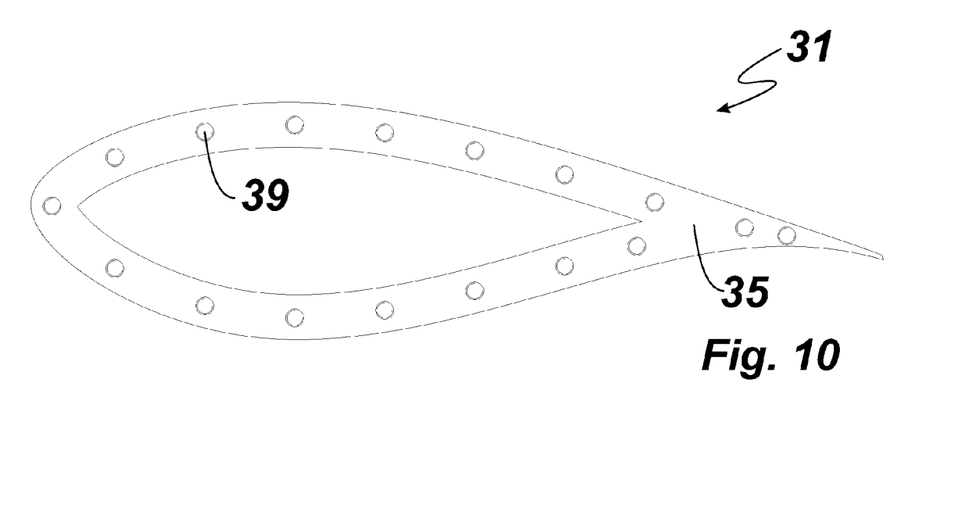
FIG. 10 shows a cross sectional view along A-A of a blade section according to the invention.
Figure 11:
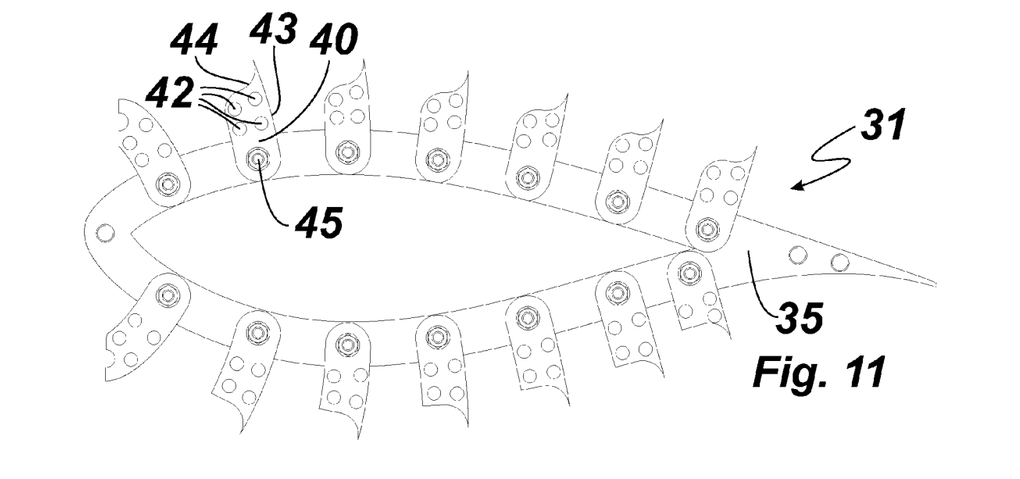
FIG. 11 shows a cross sectional view along A-A of a blade section according to the invention.
Figure 13:
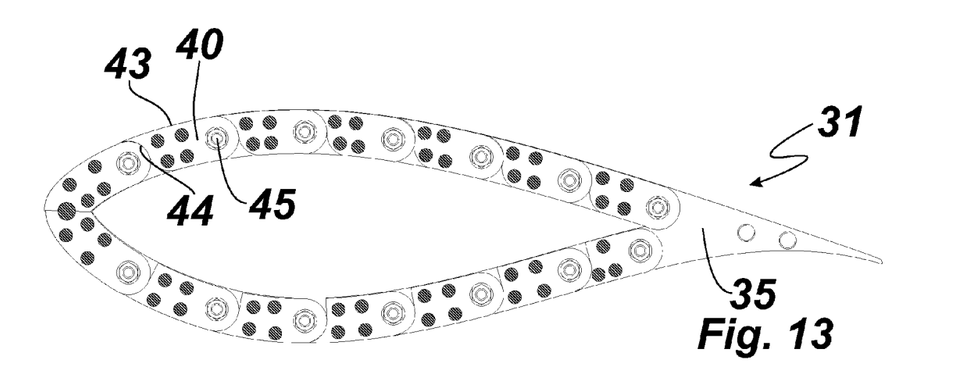
FIG. 13 shows a cross sectional view along A-A of a blade section according to the invention.

FIGS. 10, 11 and 13 illustrates a cross sectional view along line A-A of the first blade section 31 with a number of threaded shafts 39 extending from a first end 35 of the first main blade section of the first blade section 31 as shown in FIG. 10. The first connection elements 40 are connected to the threaded shafts 39 by connecting the threaded shafts 39 to the bores 41 of the first connection elements 40 and fastening the first connection elements 40 with nuts 45 as shown in FIG. 11, such that the first connection elements 40 are pivotally engaged to the shafts 39. Thereby, the first connection elements 40 can be pivoted about the rotational axis 55. The rotational axes 55 of the first connection elements 40 are preferably parallel to the longitudinal axis L of the blade.

Figure 12:
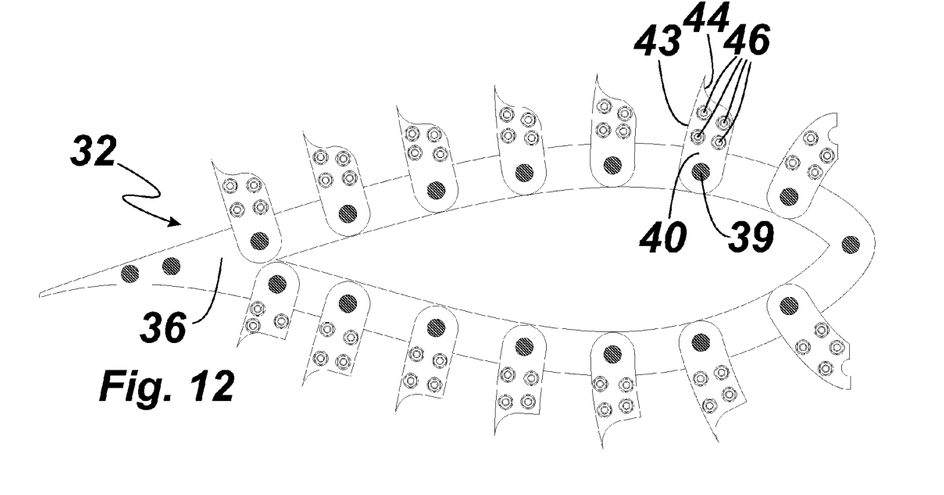
FIG. 12 shows a cross sectional view along B-B of a blade section according to the invention.

Since the joining means 42 (in form of a number of bores) are arranged in a transverse distance from the bore 41 and the rotational axis 55, the first connection elements 40 can be brought to a rotational position, in which the joining means 42 are positioned externally to the outer surface of the first main blade section as shown in FIG. 11. Thus, the joining means 42 are easily accessible and may readily be connected to the joining means 52 of the corresponding number of second connection elements 50 of the second blade section 32 as shown in FIG. 12, which illustrates a cross sectional view along line B-B in FIG. 3. The joining means 42, 52 of the first connection elements 40 and second connection elements 50 may be connected or anchored to each other by use of nut and bolt means, gluing, welding or any equivalent means.

Once the first connection elements 40 and the second connection elements 50 are anchored to each other, they may pairwise be rotated about a common rotational axis to a first pivotal position, where the first outer surfaces 43 of the first connection elements 40 flush with the first outer surfaces 53 of the second connection elements 50, as shown in FIG. 13. Furthermore, the first outer surfaces 43 of the first connection elements 40 each flush with a part of the outer surface of the first main blade section 33, and the first outer surfaces 53 of the second connection elements 50 each flush with a part of the outer surface of the second main blade section 34. Additionally, the first connection elements 40 (as well as the second connection elements 50) flush with and abuts to juxtaposed first connection elements so that a smooth aerodynamic outer surface is obtained in the entire cross section, or at least most of the cross section.

However, the first connection elements 40 are not covering the entire surface of the main blade section 33 of the first blade section 31 as the region normally referred to as the trailing surface of the blade is not covered by the connection elements 40 as illustrated in FIG. 13, whereby a truncated and/or blunt trailing surface is formed. However, this may for some applications be beneficial. However, if this is not the case and a converging trailing surface is the most beneficial, such a converging trailing surface can be obtained by mounting a shell element on the wind turbine blade that abuts and flushes with the surface of the main blade section 33. The shell element could be glued, adhered and/or fixed to a shaft extending from the first end 36 of the first blade section.

Another way to construct a converging trailing surface is to change the direction in which the connection elements 40 are pivoted, whereby it is geometrically easier to mount connection elements that also cover the trailing surface of the main blade section 33.

To secure a durable joint, it is important, that the joint is sufficiently strong and it is therefore important that the connection elements remain fixed, during use, in their first pivotal position. This can be obtained in many ways, one way is to prestress the connection elements in their first pivotal position. This can be done by having wedge shaped connection elements, such that the connection elements due to their wedge shape must be squeezed into their first pivotal position, whereby prestress is applied to the joint. Another way to secure that the connection elements remains fixed, during use, is to embed the connection elements in a substance that fills the gaps between the connection elements and hardens after the connection elements are pivoted to their first pivotal position. However, applying this solution results in that the wind turbine blade is not easily dividable after being assembled. Another way to secure a durable joint is to reduce the loads applied to the connection elements by applying, inside the wind turbine blade, an internal reinforcement structure, such as a beam, bridging over the joint, whereby the loads applied to the wind turbine blade are distributed between the internal reinforcement structure and the connection elements.

The invention has been described with reference to a preferred embodiment. However, the scope of the invention is not limited to the illustrated embodiment, and alterations and modifications can be carried out without deviating from the scope of the invention.

The invention claimed is:

1. A blade section (31, 32) for a wind turbine blade, the blade section (31, 32) extending along a longitudinal axis (L) and having at least a first end (35, 36), the blade section (31, 32) comprising a main blade section (33, 34) with a contour having an outer surface, wherein the main blade section (33, 34) at the first end (35, 36) is provided with a number of connection elements (40, 50), characterised in that each of the number of connection elements (40, 50) being pivotally engaged with the main blade section (33, 34) about a rotational axis (55), and each of the number of connection elements (40, 50) being provided with a joining means (42, 46, 52) for anchoring each of the number of connection elements (40, 50) to another blade section (31, 32), wherein the joining means (42, 46, 52) of each of the number of connection elements (40, 50) is arranged in a distance from the rotational axis (55).

2. A blade section according to claim 1, wherein each of the number of connection elements (40, 50) comprises a first outer surface part (43, 53), which in a first pivotal position flushes with at least a part of the outer surface of the main blade section (33, 34).

3. A blade section according to claim 2, wherein the first outer surface part (43, 53) of each of the number of connection elements (40, 50) in the first pivotal position abuts at least a part of the outer surface of the main blade section (33, 34).

4. A blade section according to claim 1, wherein the main blade section (33, 34) comprises a number of juxtaposed connection elements (40, 40').

5. A blade section according to claim 2, wherein the first outer surface part (43, 43') of each of the number of connection elements (40, 40') in the first pivotal position flushes with the first outer surface part of at least one juxtaposed connection element (40, 40').

6. A blade section according to claim 2, wherein the first outer surface part (43, 43') of each of the number of connection elements (40, 50) in the first pivotal position abuts the first outer surface part of at least one juxtaposed connection element (40, 40').

7. A blade section according to claim 1, wherein at least one of the number of connection elements (40, 50) is pivotally engaged with the main blade section (33, 34) by means of a shaft (39) extending from the first end (35) of the main blade section (33, 34) via a bore (41, 51) in the connection element (40, 50).

8. A blade section according to any of claim 1, wherein at least one connection element is engaged with a bore in the first end of the main blade section by means of a shaft extending from the connection element.

9. A blade section according to any of claim 1, wherein the rotational axis (55) of at least one connection element (40, 50) is substantially parallel to the longitudinal axis (L).

10. A wind turbine blade (25) comprising at least a first blade section (31) and a second blade section (32) according to claim 1, wherein the rotational axis (55) of each of the number of connection elements (40, 50) of the first blade section (31, 32) and the rotational axis (55) of each of the number of connection elements (40,50) of the second blade (31, 32) section are pairwise aligned.

11. A wind turbine blade according to claim 10, wherein the joining means (42, 46, 52) of each of the number of connection elements (40, 50) of the first blade section (31, 32) and the joining means (42, 46, 52) of each of the number of connection elements of the second blade section (31, 32) are pairwise rigidly anchored to form a number of pairwise rigidly anchored connection elements.

12. A wind turbine blade according to claim 10, wherein each of the number of the pairwise rigidly anchored connection elements in the first pivotal position are fixed by a fastening means (60) to at least one juxtaposed pairwise rigidly anchored connection element.

13. A method for assembling a wind turbine blade (30) according to claim 10, wherein the method comprises the following steps:
   a) aligning the first blade section (31, 32) and the second blade section (31, 32) in the longitudinal direction (L), so at least one of the first connection elements and at least one of the second connection elements has a common rotational axis (55),
   b) pairwise rigidly anchoring the number of first connection elements (40, 50) of the first blade section (31, 32) to the number of second connection elements (40, 50) of the second blade section (31, 32) via the joining means (42, 46, 52), and
   c) pivoting each of the number of the pairwise rigidly anchored connection elements to the first pivotal position.

14. A method according to claim 13, wherein the joining means (42, 46, 52) in step b) comprises nut and bolt means, adhesion, gluing or welding.

15. A method according to claim 13, wherein the method further comprises a step, wherein the pairwise rigidly anchored connection elements are fixed by a fastening means (60) to at least one juxtaposed pairwise rigidly anchored connection elements.

* * * * *

UNITED STATES PATENT AND TRADEMARK OFFICE
CERTIFICATE OF CORRECTION

PATENT NO. : 8,770,940 B2  
APPLICATION NO. : 13/059866  
DATED : July 8, 2014  
INVENTOR(S) : Rajkumar Rajamani Page 1 of 1

It is certified that error appears in the above-identified patent and that said Letters Patent is hereby corrected as shown below:

IN THE CLAIMS:

Claim 8, Column 10, Line 14: After "A blade section according to" and before "claim 1" Please delete "any of".

Claim 9, Column 10, Line 18: After "A blade section according to" and before "claim 1" Please delete "any of".

Signed and Sealed this  
Second Day of December, 2014

Michelle K. Lee  
*Deputy Director of the United States Patent and Trademark Office*